US012083536B2

(12) United States Patent
Van Wees

(10) Patent No.: US 12,083,536 B2
(45) Date of Patent: Sep. 10, 2024

(54) METHOD AND AN APPARATUS FOR CLEANING THE AIR

(71) Applicant: Van Wees Innovations B.V., Amsterdam (NL)

(72) Inventor: Peter Willem Van Wees, Amsterdam (NL)

(73) Assignee: Van Wees Innovations B.V., Amsterdam (NL)

( * ) Notice: Subject to any disclaimer, the term of this patent is extended or adjusted under 35 U.S.C. 154(b) by 363 days.

(21) Appl. No.: 17/275,503

(22) PCT Filed: Sep. 12, 2019

(86) PCT No.: PCT/NL2019/050593
§ 371 (c)(1),
(2) Date: Mar. 11, 2021

(87) PCT Pub. No.: WO2020/060392
PCT Pub. Date: Mar. 26, 2020

(65) Prior Publication Data

US 2021/0276020 A1 Sep. 9, 2021

(30) Foreign Application Priority Data

Sep. 18, 2018 (NL) ...................................... 1043003

(51) Int. Cl.
*B03C 3/155* (2006.01)
*B03C 3/017* (2006.01)
(Continued)

(52) U.S. Cl.
CPC .............. *B03C 3/155* (2013.01); *B03C 3/363* (2013.01); *B03C 3/38* (2013.01); *B03C 3/0175* (2013.01)

(58) Field of Classification Search
CPC ........... B03C 3/155; B03C 3/363; B03C 3/38; B03C 3/0175; B03C 3/361; B03C 3/368; B03C 3/41; B03C 3/34
See application file for complete search history.

(56) References Cited

U.S. PATENT DOCUMENTS 6,872,238 B1 * 3/2005 Truce ........................ B03C 3/12 96/87
7,029,520 B2 * 4/2006 Park ........................ B01D 46/50 55/525
(Continued)

FOREIGN PATENT DOCUMENTS

EP 0403230 A1 * 12/1900 .............. F24F 8/192
EP 1434014 A2 6/2004
(Continued)

OTHER PUBLICATIONS

European Patent Office, International Search Report and Written Opinion, PCT/ISA/220, Application No. PCT/NL2019/050593, Dec. 18, 2019, European Patent Office, Rijswijk, Netherlands.

*Primary Examiner* — Christopher P Jones
*Assistant Examiner* — Sonji Turner
(74) *Attorney, Agent, or Firm* — Thomas P. O'Connell; O'Connell Law Firm

(57) ABSTRACT

The present invention relates to a method and an apparatus for cleaning outside or inside air that is polluted by solid particles. The method comprises a specific sequence of measures for promoting agglomeration and/or coagulation of the particles, including ionization, followed by a series of filtrations. This lead to a surprising removal of ultra-fine particles of 1-100 μm with a great efficiency. The invention includes an apparatus for the application of the method.

7 Claims, 2 Drawing Sheets

(51) Int. Cl.
*B03C 3/36* (2006.01)
*B03C 3/38* (2006.01)

(56) References Cited

U.S. PATENT DOCUMENTS

| | | | | |
|---|---|---|---|---|
| 8,545,607 | B2 * | 10/2013 | Cambo | B01D 46/521<br>55/486 |
| 9,771,651 | B2 * | 9/2017 | Wochner | C01B 33/035 |
| 2009/0084265 | A1 * | 4/2009 | Tiefenauer | B01D 46/50<br>96/55 |
| 2013/0071298 | A1 * | 3/2013 | Tanimura | B03C 3/02<br>422/187 |
| 2013/0255231 | A1 * | 10/2013 | Hodgson | F01N 3/0275<br>60/275 |
| 2016/0096134 | A1 | 4/2016 | Santini et al. | |

FOREIGN PATENT DOCUMENTS

| | | | | |
|---|---|---|---|---|
| JP | 2000084325 | A * | 3/2000 | |
| KR | 101461849 | B1 | 11/2014 | |
| WO | WO-2017179984 | A1 * | 10/2017 | B01D 53/32 |

* cited by examiner

METHOD AND AN APPARATUS FOR CLEANING THE AIR

FIELD OF THE INVENTION

The present invention relates to a method and an apparatus for cleaning the air that is polluted by solid particles. The method comprises a specific sequence of measures for promoting agglomeration and/or coagulation of the particles, including ionization, followed by filtering.

In addition, the invention includes an apparatus for the application of the method.

BACKGROUND OF THE INVENTION

Depending on emissions from industries, traffic exhaust and local environmental regulations, the air quality outdoors varies significantly from one geographical location to another. In many locations the air quality poses serious health risks for people living in that area.

Smog warnings have become an almost daily event in many places around the globe, particularly in and around major cities.

Indoors, the air can be even more polluted than the air outside. The solid particles in air pollution that are the most harmful for human beings are the so-called nanoparticles with a particle size below 100 nanometers. So far, the methods and systems which are available for the removal of solid particles from the air are not capable of removing nanoparticles. Furthermore, an apparatus for the removal of particles from the air according to the prior art can only handle air volumes that are so small (maximum in the order of 10.000 cubic meters per hour) that the cleaning effect of one apparatus on the overall outside air, for example in a city, is negligible. To obtain some noticeable effect a very large number of units of such an apparatus would have to be operated simultaneously, which would be prohibitive from an investment and operational costs point of view.

Some prior art technologies for the removal of solid particles from air are reasonably successful in removing particles with a particle size of roughly 0.3 micrometers, i.e. 300 nanometers, and above. Of those prior art technologies the one disclosed in WO 2017/179984 seems to be the most versatile, although still not good enough in terms of removal of the smallest, most harmful, particles and in terms of the capacity to clean enough outside air per unit of time to have a noticeable impact on the outside air quality in, for example, a city.

The method according to that prior art technology for cleaning air polluted by solid particles, comprises transporting the air to be cleaned through an airflow channel of an apparatus via an inlet opening of the airflow channel and discharging the air that is transported through the airflow channel via a discharge opening, and guiding the air to be cleaned along an AC (Alternating Current) ionizer, which is placed in the airflow channel, for ionizing particles present in the airflow and for creating agglomeration of the ionized particles, wherein the flow area of the apparatus close to the ionizer is smaller than the flow area of the apparatus close to the first filter that is positioned downstream of the ionizer. The method comprises filtering with a filter which is located at a position between the ionizer and the discharge opening, wherein the filter has a pore size which is larger than the size of at least a part of solid particles that are present in the supplied air, and removing agglomerated particles from the air with the filter. As described in WO 2017/179984 this method comprises providing an ionization having a low effective degree of ionization of the particles that are present in the airflow by ionizing only a part of the particles that are present in the airflow, in particular less than about 30% thereof, e.g. 20% to 25% thereof and/or by ionizing particles with mutually opposite polarities such that the number of ionized particles of the one polarity and/or the total charge transferred to the particles of the one polarity forms an excess of more than about 20% of the particles of the other polarity and/or, respectively, of the total charge transferred to the particles of the other polarity, e.g. an excess of about 25% to 30% thereof.

By creating one or more flared sections in the flow channel of the apparatus which function as a diffuser, followed by a converging section, acting as a compressor, the speed of the particles in the air flow is decelerated and subsequently accelerated, whereby smaller and larger particles obtain different speeds and collide and agglomerate, which promotes filtering them out with a filter that has a pore size which is larger than the vast majority of the largest particles present in the air.

In a preferred embodiment the prior art method disclosed in WO 2017/179984 comprises the use of a class F9 filter with a carbon mesh as a first filter downstream of the ionizer. This filter not only filters out particles but also eliminates $NO_x$ and $SO_x$ to a large degree. The next filtering step comprises a combination of class G1, G2 and/or G3 carbon filters, which are electrically charged to attract ionized particles that have an opposite charge.

Unfortunately, the prior art method and apparatus as disclosed in WO 2017/179984 fail to effectively remove particles with a size below roughly 0.1 micrometers, i.e. 100 nanometers, which include the most harmful particles for human beings.

SUMMARY OF THE INVENTION

The invention relates to a method and an apparatus for the removal of solid particles from the air, comprising a novel and non-obvious addition to a method according to the prior art that was incapable of removing particles with a size below 100 nanometers. The method comprises a specific sequence of measures for promoting agglomeration and/or coagulation of the particles, including preferably DC (Direct Current) ionization of a part of the particles, followed by filtering the air with the ionized particles with a class F9 filter or a filter comparable thereto and, subsequently, an electrically charged filter unit comprising one or more filters from the classes G1, G2 and/or G3, followed by a novel and non-obvious filtering step comprising the use of a class U15 filter.

Furthermore, the invention includes an apparatus for the application of said method. This method may specifically be applied to polluted outside air as great volumes of air may be treated but is suitable for the treatment of polluted inside air as well.

BRIEF DESCRIPTION OF THE DRAWINGS

The objects and advantages of the present invention will become more apparent from the following description when taken in conjunction with the accompanying drawings, in which.

Identical or similar parts have been designated with identical or similar reference numbers in the drawings.

DETAILED DESCRIPTION OF EMBODIMENTS OF THE INVENTION

An embodiment of a method and an apparatus for cleaning air will now be described with reference to the drawings.

Figure 1:
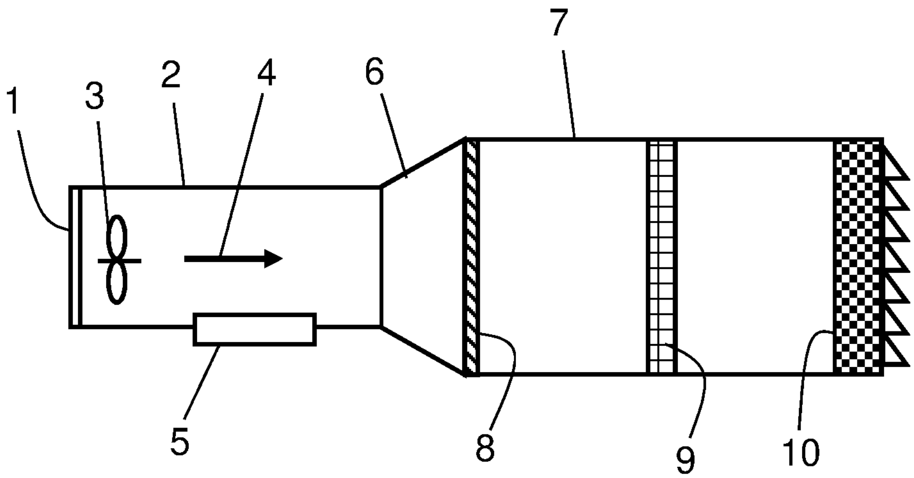
FIG. 1 is a schematic vertical longitudinal section of an embodiment of an apparatus for the application of the air filtering method according to the invention.

The method for cleaning air by removing solid particles from the air can best be described based on the embodiment of an apparatus for the application of said method as shown schematically in FIG. 1.

The method according to the invention comprises the use of an apparatus with an air inlet 1, a first air channel with a substantially constant cross sectional surface area and a fan 3, positioned inside the first air channel 2 at or immediately downstream of the air inlet 1 to blow the air through the apparatus. A large portion of prior art air cleaning devices comprises a fan which is located in the vicinity of the air outlet end of the device, hence sucking the air through the device including its filters. The fact that the apparatus according to the invention comprises a fan 3 that is located at the air inlet end of the apparatus results in the fan blowing, which can also be described as pushing, the air through the apparatus including its filters. This, generally, provides a better control of the air flow. Hereinafter the designation 'located at' shall be construed to also include 'in the immediate vicinity of'. The invention envisages that the apparatus can rotate along a vertical axis in order to allow alignment of the apparatus such that the air inlet 1 can be positioned perpendicular to the direction of the wind, thus utilizing the wind energy which saves some input energy, for example electricity, for operation of the fan 3. The arrow 4 depicts the air flow direction. The method further includes means for ionizing a part, for example less than thirty percent, of the particles in the air that passes through the first air channel 2. Contrary to the prior art methods, the present invention comprises preferably DC (Direct Current) instead of AC ionization as described in the prior art to prevent the formation of ozone. In the embodiment of the apparatus for application of the method according to the invention as shown in FIG. 1 the ionization means comprise an ionizer 5. Contrary to what the drawing in FIG. 1 may suggest the ionizer 5 is not necessarily restricted to one unit that is positioned eccentrically inside the first air channel 2, but may also comprise a plurality of ionization units that are distributed uniformly along the circumference of the inlet air channel 2 in order to achieve uniform ionization of a part of the air. In various embodiments of the apparatus the control of the ionizer 5 comprises particle density measuring means.

The method envisages that after a high initial air speed is created, and hence a high speed of the particles in the air, the air speed is reduced substantially. In the embodiment of the apparatus shown in FIG. 1 this is achieved by fluidically attaching the downstream end of the first air channel 2 to a flared section 6, hereinafter also referred to as a diffuser 6. This enlargement of the cross sectional surface area relative to that of the first flow channel results in a substantial reduction of the air speed, which in turn results in collision and agglomeration of particles with mutually differing masses.

These agglomerated particles are then filtered out by a first filter 8, which in an embodiment comprises a class F9 filter. This filter may be adapted, for instance relating to the length thereof to create a flow with a low resistance. In an advantageous embodiment the length of the filter was increased with 25%. So here it is also about the balance to firstly fight the heaviest pollution and then again with the lowest possible flow resistance. The related F8 and H10 filters seem to be less suitable but there may be other filters with a comparable performance of ≥95% and a particulate size approaching 100% retention of particles with >1 μm diameter which are suitable in the apparatus according to the invention indeed. The application of such a filter comparable to the class F9 filter belongs to the scope of the invention as well.

Subsequently, the method according to the invention envisages that the particles that pass through the pores of the first filter, which particles are still ionized, accelerate and move towards a second air filter 9, as shown schematically in the embodiment of an apparatus for the application of the method as per FIG. 1. The second air filter 9 comprises a combination of class G1, G2 (aimed at filtering particles with a size of 10 micrometers and larger) and/or G3 carbon filters. A G3 filter is in principle aimed at arresting particles with a size in the range of 3,0 to 10.0 micrometers. The second air filter 9 is electrically oppositely charged to the charge of the ionized particles. Due to this counter charging the second air filter 9, has a high degree of filtering out particles and virtually acts as a wall. Therefore, the second air filter may hereinafter also be referred to as a 'carbon wall' 9.

Figure 2:
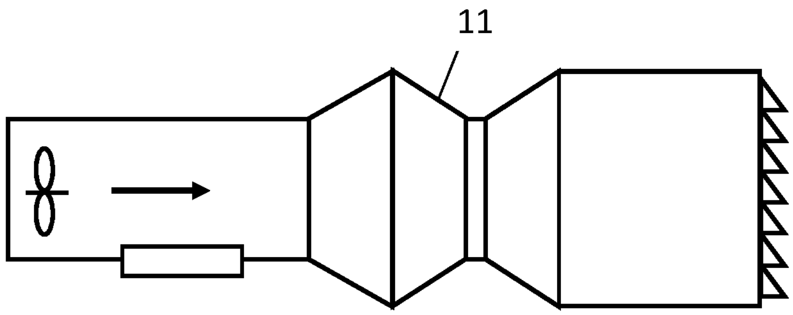
FIG. 2 is a schematic side view of another embodiment of an apparatus for the application of the air filtering method according to the invention.

FIG. 2 is a schematic side view of an embodiment of an apparatus for the application of the air filtering method according to the invention wherein the apparatus comprises both a diffuser 6, a diverging section, and a compressor 11, a converging section, creating an air speed reduction, followed by an air speed increase. The invention envisages that an apparatus for the application of the method can comprise more than one diffuser and/or more than one compressor section.

In spite of the important improvement of the prior art method for cleaning air by replacing AC ionization by DC ionization, the cleanliness of the air after the filtration by the second filter 9 was still not good enough. Especially, the sub 100 nanometer particles were still present in the air. In order to improve the cleaning results the inventor added a third filter 10 comprising a Class U15 filter, aimed at filtering particles with a size of 300 nanometers and larger. This created an unexpected result, that is at the least very surprising for persons skilled in the art. It defies logic and is counterintuitive. The same results were used by applying a stress test. The highly skilled filtration specialists of 'TüV', a renowned organization for testing and certification, who performed a validation test at the request of the inventor, were also stunned by the results.

Figure 3:
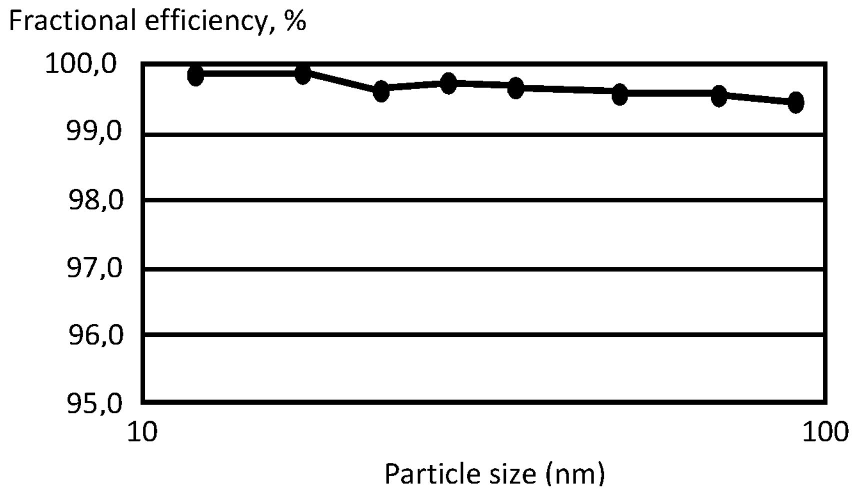
FIG. 3 is a graph of fractional efficiency measurements that were performed on air that was cleaned by an apparatus using the method according to the invention.

FIG. 3 is a graph of the measured fractional efficiency in removing ultra-fine particles, being particles in the range from 1 to 100 nanometers from air using the method according to the invention. So, the addition of a 300 micrometers filter almost fully eliminates ultrafine particles from the air.

Based on this extremely high efficiency in the removal of ultra-fine particles and the fact that an apparatus for the application of the method according to the invention is easily scalable, the present invention appears to be unique by providing a solution for cleaning up smog from the outside air. Based on calculations it is anticipated that the construction and operation of an apparatus with a cleaning capacity of more than 4,5 million cubic meters of outside air per hour is feasible at a reasonable cost. Installation of such an apparatus at different locations in smog-prone cities will be able to provide noticeable relief for its inhabitants.

There are no known prior art methods for efficient removal of ultra-fine particles from air, certainly not at high air throughputs. There are not even commercial filter materials with a pore size below 300 nanometers that could be used in high volume air cleaning.

In addition, even if such filter materials would be available it is important to realize that in prior art filtration methods there is a trade-off between the removal of fine particles and filter cleaning or replacement frequency. If the pore size of a filter element is very small, i.e. smaller than the size of the smallest particles that have to be removed, the filter will clog rapidly, which will require frequent filter cleaning or replacement. Furthermore, the back pressure increase caused by the clogging filter material will result in a high energy requirement for maintaining sufficient air flow through the cleaning apparatus.

In WO 2017/179984, page 24, lines 23-25 it has been indicated that a filter behind the apparatus of that invention would be possible but unnecessary. This leads away from the present invention that the addition of a 300 μm filter after said apparatus would surprisingly lead to a removal of ultra-fine particles of 1-100 μm with a great efficiency.

As described above, the invention may especially be embodied in the following clauses, wherein the clauses are merely numbered for reference reasons.

1. A method for the removal of solid particles from air involving the following steps:
   - blowing the air through a channel (1) in which a part of the particles in the air is ionized;
   - slowing down the air speed, for example through a diffuser (6);
   - filtering the air with a class F9 filter or a suitable comparable filter (8);
   - blowing the air that was filtered by the class F9 filter or the suitable comparable filter (8) through an electrically charged filter unit (9) that comprises one or more filters from the classes G1, G2 or G3, characterized in that the air that was filtered by the electrically charged filter unit (9) is subsequently forced to flow to and through a class U15 filter (10).
2. The method according to clause 1, characterized in that outside air was filtered.
3. The method according to clause 1 or 2, characterized in that the ionization of a part of the particles in the air comprises DC ionization.
4. The method according to clause 3, characterized in that the electrically charged filter unit (9) is charged with the opposite polarity of the polarity of the charge of the ionized particles in the air.
5. An apparatus for the application of the method for the removal of solid particles from the air according to any of the preceding claims, comprising an air inlet (1), a first air channel (2), a fan (3) located at the upstream end of said first air channel, an ionizer (5), a diffuser (6), a second air channel (7), a class F9 filter or a suitable comparable filter (8), an electrically charged filter unit (9) comprising one or more filters from the classes G1, G2 and/or G3, wherein the apparatus comprises a class U15 filter (10) downstream of the electrically charged filter unit (9).
6. The apparatus according to clause 5, characterized in that the apparatus comprises a compression section (11).

The term "comprise" includes also embodiments wherein the term "comprises" means "consists of". The term "comprising" may in an embodiment refer to "consisting of" but may in another embodiment also refer to "containing at least the defined species and optionally one or more other species". The term "and/or" especially relates to one or more of the items mentioned before and after "and/or". For instance, a phrase "item 1 and/or item 2" and similar phrases may relate to one or more of item 1 and item 2.

While only certain features of the invention have been illustrated and described herein, many modifications and changes will occur to those skilled in the art. It is, therefore, to be understood that the appended claims are intended to cover all such modifications and changes as fall within the true spirit of the invention.

For example, where a specific class of filters is mentioned, this shall be construed to also refer to non-classified filters with an identical or similar pore size. In this context the word "similar" allows for a difference of ±50% in the pore size. The filter classes G and U mentioned are known under European normalization standards EN 779. Furthermore with particles in the air generally solid particles have been meant. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements.

In a device claim enumerating several means, several of these means may be embodied by one and the same item of hardware. The mere fact that certain measures are recited in mutually different dependent claims does not indicate that a combination of these measures cannot be used to advantage.

The various aspects discussed in this application can be combined in order to provide additional advantages. Further, the person skilled in the art will understand that embodiments can be combined, and that also more than two embodiments can be combined.

The invention claimed is:

1. A method for the removal of solid particles from air, including sub-100 nanometer, ultra-fine particles, the method comprising:
- blowing the air at an air speed through a channel in which particles in the air are ionized to have a charge;
- slowing down the air speed;
- filtering the air with a filter, wherein the filtering the air is performed with a class F9 filter or a suitable comparable filter;
- blowing the air that was filtered by the filter through an electrically charged filter unit that comprises one or more filters from classes G1, G2 or G3;
- subsequent to blowing the air that was filtered by the filter through the electrically charged filter unit, forcing the air that was filtered by the electrically charged filter unit to flow to and through a class U15 filter adapted to filter particles with a size of 300 nanometers and larger.

2. The method according to claim 1, wherein the air blown through the channel comprises outside air.

3. The method according to claim 1 wherein the particles in the air are ionized by DC ionization.

4. The method according to claim 3, wherein the electrically charged filter unit is charged with an opposite polarity of a polarity of the charge of the particles in the air that are ionized.

5. An apparatus for the application of the method for the removal of solid particles from air, including sub-100 nanometer, ultra-fine particles, according to claim 1, the apparatus comprising an air inlet, a first air channel with an upstream end, a fan located at the upstream end of said first air channel, an ionizer, a diffuser, a second air channel, a filter comprising a class F9 filter or a suitable comparable filter, an electrically charged filter unit comprising one or more filters from the classes G1, G2 and/or G3, and a class U15 filter downstream of the electrically charged filter unit wherein the class U15 filter is adapted to filter particles with a size of 300 nanometers and larger.

6. The apparatus according to claim 5, wherein the apparatus further comprises a compression section.

7. The method according to claim 1, wherein the step of slowing down the air speed comprises slowing down the air speed through a diffuser.

* * * * *